United States Patent [19]

Tuovinen et al.

[11] 4,313,849
[45] Feb. 2, 1982

[54] PROCESS FOR THE PRODUCTION OF ACTIVATED CARBON FROM A MOIST ORGANIC SUBSTANCE

[75] Inventors: Frans H. Tuovinen, Ulvila; Risto J. Honkala; Maija-Leena Metsärinta, both of Vanha-Ulvila, all of Finland

[73] Assignee: Outokumpu Oy, Helsinki, Finland

[21] Appl. No.: 97,641

[22] Filed: Nov. 27, 1979

[30] Foreign Application Priority Data

Nov. 28, 1978 [FI] Finland .................................. 783641

[51] Int. Cl.$^3$ ....................... C01B 31/10; C10B 49/02
[52] U.S. Cl. ...................................... 252/421; 201/33; 423/449
[58] Field of Search ...................... 201/2.5, 21, 25, 27, 201/28, 29, 32, 33, 36, 37, 42, 43, 44; 202/91, 99, 100, 131; 252/421, 445; 423/449, 460, 461

[56] References Cited

U.S. PATENT DOCUMENTS

| | | | |
|---|---|---|---|
| 2,287,437 | 6/1942 | Lesher et al. ...................... | 201/33 X |
| 2,650,190 | 8/1953 | Steinschlaeger .................. | 201/25 X |
| 2,725,346 | 11/1955 | Farber .............................. | 201/2.5 X |
| 3,298,928 | 1/1967 | Esterer ............................. | 201/2.5 X |
| 3,783,128 | 1/1974 | Thompson ....................... | 252/421 X |
| 3,950,267 | 4/1976 | Arakawa et al. ................. | 201/32 X |
| 3,966,560 | 6/1976 | Farago et al. .................... | 201/27 X |
| 4,122,036 | 10/1978 | Lewis ............................... | 201/2.5 X |

Primary Examiner—Bradley Garris
Attorney, Agent, or Firm—Brooks, Haidt, Haffner & Delahunty

[57] ABSTRACT

Coke or activated carbon is produced from a moist organic substance, for example from a residue from the production of furfural. Initially the moist organic substance is introduced together with hot flue gases into a drying zone of a cylinder furnace and the organic substance is mixed with the hot gases and dried according to the co-current principle. Subsequent thereto the dried substance and the gases are directed into a coking zone of the same furnace, an oxygen-bearing gas also being introduced into said coking zone and the volatile constituents of the organic substance being reduction burned according to the co-current principle so as to produce a coked product. When coke is to be produced, said coked product is withdrawn together with gases from the trailing end of the furnace and the gases are separated therefrom. When producing activated carbon, the coked organic material and the hot moist gases are mixed with each other in an activation zone according to the co-current principle, and with no additional water vapor added, so as to obtain an activated product and, finally, said product is withdrawn from the furnace and the gases are separated therefrom. Part of the hot gases obtained may be recirculated to the drying zone.

3 Claims, 2 Drawing Figures

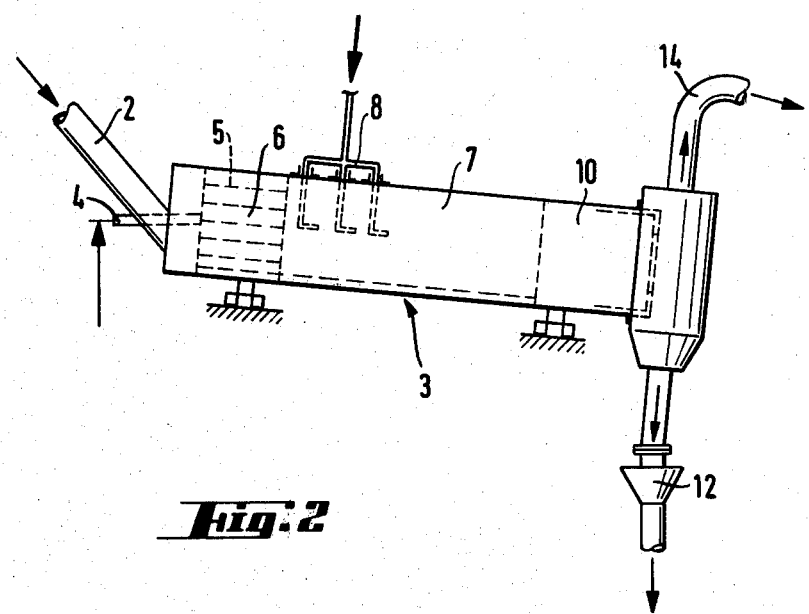

PROCESS FOR THE PRODUCTION OF ACTIVATED CARBON FROM A MOIST ORGANIC SUBSTANCE

BACKGROUND OF THE INVENTION

1. Field of the Invention

The present invention relates to a process for the production of activated carbon or coke from a moist organic substance, and it relates in particular to a process in which a moist organic substance is first mixed with hot flue gases in a drying zone, whereafter the dried organic substance and an oxygen-bearing gas are directed into the coking zone for a controlled burning of the volatile constituents of the organic substance, then the coked final product is separated from the gas or, alternatively, the product emerging from the coking zone is directed into the activation zone, where it is mixed with hot, moist gases, and finally the gases are separated from the activated carbon. The invention also relates to a cylinder furnace assembly for carrying out the above process.

2. In connection with the mechanical processing of wood, a great deal of moist residues are produced. Attempts have been made to exploit these residues by burning them. However, the high moisture content in the residue lowers the amount of thermal energy obtained from it. Milled peat used for fuel, even air dried, contains a large amount of water. Also, in furfural production a furfural residue is produced which is rather finely divided and moist (moisture content approx. 40–50% by weight). This residue contains only some ash and a large amount of carbon and volatiles. It can also be destroyed by burning.

The benefit derived from the burning of the above organic, finely-divided substances, which contain large amounts of water, carbon and combustible volatiles, is decreased by their high moisture content. Furthermore, the burning of such substances by means of conventional combustion apparatuses is inconvenient.

In attempts at using the above organic substances in, for example, the production of activated carbon, they are in general at least partly dried, whereafter they are usually first charred and then activated using water vapor. The investment and operating costs of such previously known production processes for activated carbon are, however, considerably high, owing to the several separate treatment stages and the high energy requirement, especially when using superheated water vapor for the activation. When block peat is used as the raw material for activated carbon and when the water vapor activation is carried out in a cylinder furnace, a long reaction period is necessary and the mechanical strength of the product is low. The activated carbon thus produced is not suitable where a high mechanical strength is required of the carbon.

German Patent Application No. 2,606,368 discloses an apparatus in which the coking and the activation are performed in the same rotating furnace; however, in this furnace the coking zone and the activation zone have been separated by means of a partition. In this apparatus the coked substance is cooled with water and the produced water vapor is directed into the activation zone. This apparatus is not as such applicable to a moist residue but only to a dried residue.

SUMMARY OF THE INVENTION

The present invention provides a process for the production of coke from a moist organic substance, which comprises conducting the moist organic substance into a drying zone of a gas chamber; mixing the organic substance in the drying zone with hot flue gases according to the co-current principle; directing the dried organic substance into a coking zone of the same gas chamber; introducing an oxygen-bearing gas into the coking zone for the controlled burning of the volatile constituents of the organic substance at an elevated temperature and according to the co-current principle; and separating the coked material from gases.

The invention also provides a similar process for the production of activated carbon, wherein upon the coking stage the coked material and hot moist gases emerging from the coking zone are further directed into an activation zone of the same gas chamber, said coked material and hot gases are mixed with each other in said activation zone according to the co-current principle, whereby no additional water is introduced and, finally, the activated product is withdrawn from the activation zone and the gases are separated therefrom.

It is an object of the present invention to provide a simpler and more economical process than the previous ones for the production of coke and activated carbon from a moist organic substance such as moist furfural residue, milled peat or crushed block peat.

Relatively dry residue can also be treated by the process and apparatus according to the present invention, provided that the residue is first moistened.

The process and apparatus according to the present invention can be used for producing activated carbon and coke directly in one stage from moist, finely-divided organic substances. According to a specific embodiment of the invention, the moist raw material and the auxiliary fuel to be burned, and possibly flue gases obtained from the outlet end of the furnace, are brought into contact with each other by feeding them into the drying zone of the cylinder furnace, co-current principle, wherein water is released from the moist raw material, and when the dried raw material is heated further, combustible gases and tar are released from it in the coking zone. These are burned by means of air or oxygen, or a mixture of the same, fed in at different points of the mantle of the cylinder furnace, and the temperature and the composition of the gas are adjusted so as to produce either activated carbon or coke as the final product.

Considerable advantages over conventional activation processes carried out using water vapor have been gained by the activation process and apparatus according to the present invention. The profitability of the process and the apparatus are increased by, for example, the following advantages: the use of inexpensive moist and finely-divided residues and raw materials, a single-stage combined drying, coking and activation process, the elimination of separate feed of water vapor into the activation zone, the obtaining of products which are already classified into different particle size categories, some being granular and some pulverous, the simplicity and easy control of the process, and an apparatus which is uncomplicated and reliable in operation.

BRIEF DESCRIPTION OF THE DRAWINGS

FIG. 2 depicts a cross-sectioned side view of a cylinder furnace assembly for carrying out the drying and coking process according to the invention.

DESCRIPTION OF THE PREFERRED EMBODIMENTS

Figure 1:
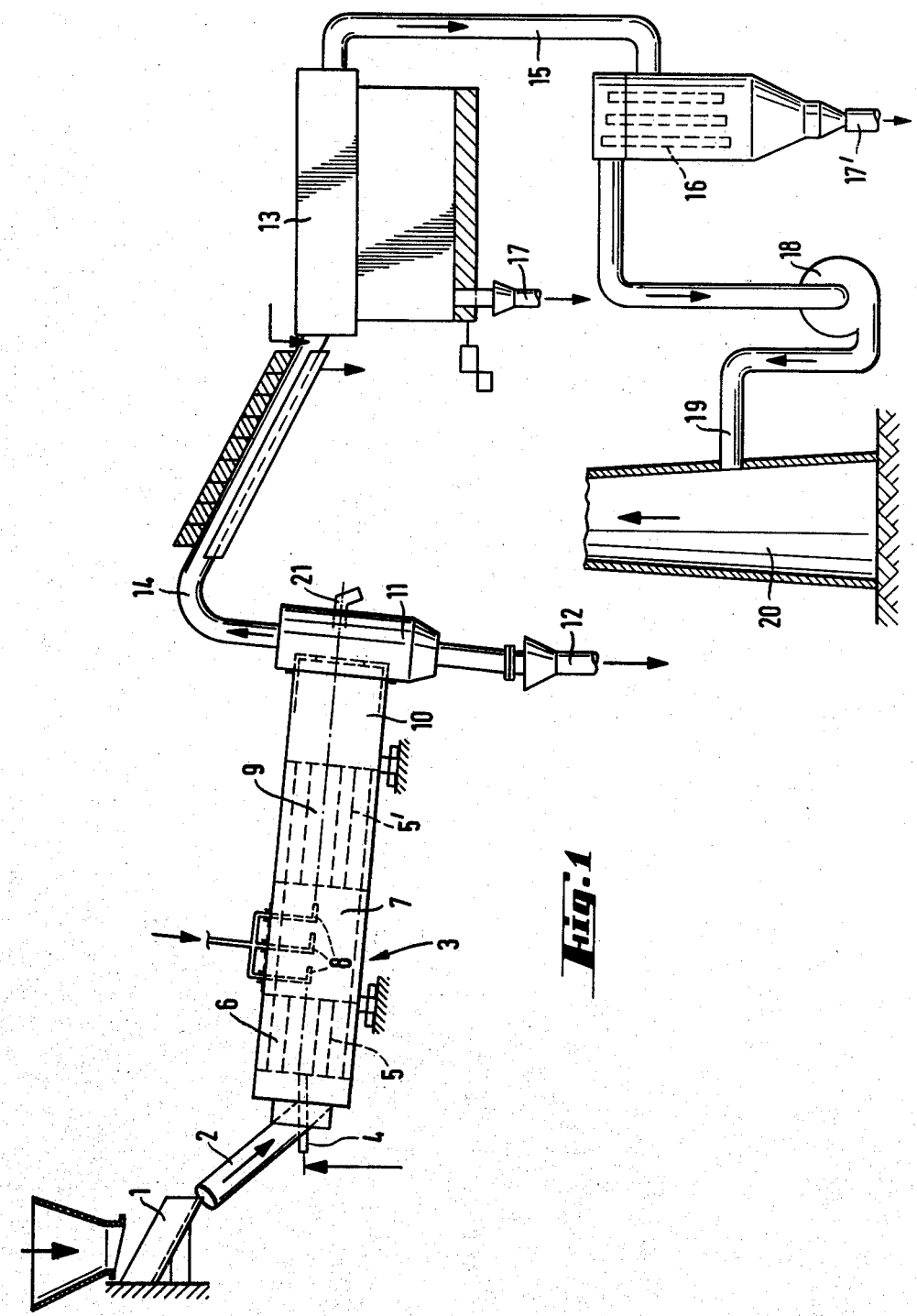
FIG. 1 depicts a cross sectioned side view of an apparatus for carrying out the drying, coking and activation process according to the invention.

In FIG. 1, moist furfural residue with a water content of approx. 40-50% is fed in by means of feeder 1 and further along the pipe 2 to the leading end of the cylinder furnace 3. At the leading end of the cylinder furnace 3 there is, furthermore, a burner 4, in which a mixture of a fuel, such as natural gas, and air and/or oxygen is burned. The fuel used can also be oil, cycled gas or the material being treated. Several longitudinal lifting devices 5 have been attached to the interior wall of the leading end of the cylinder furnace 3, peripherally at a distance from each other, for mixing the moist furfural residue and the hot flue gases with each other in order to dry the furfural residue in the drying zone 6. From the drying zone 6, the dried furfural residue and the moist flue gases are directed into the coking zone 7, which has air nozzles 8 for feeding additional air into the coking zone 7 for the coking of the dried furfural residue and for burning the combustible gases produced during the coking.

In the embodiment depicted in FIG. 1, several lifting devices 5' have been fitted immediately beyond the coking zone 7 longitudinally on the interior wall of the cylinder furnace 3, peripherally at a distance from each other, for mixing the coke and the moist, hot gases emerging from the coking zone 7, in order to activate the coke in the activation zone 9. At the trailing end of the cylinder furnace 3 there is, furthermore, a cooling zone 10 and an end chamber 11, through which the coarsest fraction 12 of the product is withdrawn from the cylinder. The mixture of the gas and the product contained in it is directed into the gas-cooling system in the pipe 14. From the gas-cooling system 13, where the finer fraction 17 of the product is separated, the remainder is directed further along the pipe 15 into the bag filter 16, where the finest fraction 17' of the product is separated from the gases, and the gases are directed into the flue 20 via the outlet pipe 19 provided with a blower 18.

The outlet gas of the cylinder furnace 3 contains a large amount of combustible constituents, and most of these can be burned prior to the gas-cooling apparatus 13, or the waste heat vessel, whereby this energy can be recovered. Such an afterburner is shown in FIG. 1 and indicated by 21. The combustible constituents can also be burned after the pulverous activated carbon 17 has been separated from the gas.

Part of the outlet gas of the cylinder furnace can also be cycled. In this case the outlet gas emerging from the furnace can be directed into a cyclone (not shown in the figures), where the dusts are separated from it and part of the gas is recycled to the feeding end of the furnace and an oxygen-bearing gas is added to the gas in order to burn it. The remainder of the gas passes to cooling and dust removal. The cycled gas fed to the feeding end of the furnace can, of course, also be recovered from the outlet gas after the cooling and dust separation.

When only coke is desired, the lifting devices 5' fitted in the apparatus of FIG. 1 next in succession to the coking zone 7 can be eliminated. Activation is an endothermal reaction and requires, in order to take place, an effective mixing of the gas and the material. On the other hand, coking does not require such effective mixing, and especially if the intention is to perform the coking at a high temperature, 900°-1000° C., the mixing must be eliminated in order to produce coke and not activated carbon. When dried furfural residue is coked, the retention period in the furnace is shorter and the coke does not have time to become activated. In this case the capacity of the cylinder furnace 3 can also be adjusted to a higher level.

The fuel can be burned with the aid of either air or oxygen, or a mixture of the same. When a concentrated gas is desired, for example for gasing or for the production of a high-grade activated carbon, the burning can be carried out with pure oxygen.

The cylinder furnace depicted in FIG. 2 differs from the depicted in FIG. 1 in that it has no lifting devices 5' immediately beyond the coking zone, i.e. the activation zone 9 has been eliminated.

The process is controlled by regulating the retention period of the material and the temperature and the composition of the gas. If necessary, the moisture content of the feed can be decreased by drying the feed by means of outlet gas or, if the feed is too dry for activation, its moisture content can be increased. The amount of auxiliary fuel required by the process can be decreased by burning part of the feed, by burning a larger poroportion of the volatile constituents of the feed, by pre-heating the combustion air indirectly by means of outlet gases, or by cycling part of the outlet gases.

The invention is described below in more detail with the aid of examples.

EXAMPLE 1

Furfural residue which contained volatiles 78%, its analysis being C 49% and ash 1.7% of the dry matter, was fed into a cylinder furnace having a length of 10.6 m and an inner diameter of 0.8 m. The moisture content of the furfural residue was 52.5% and the particle size of the dry matter was 94% under 10 mm and 8% under 0.42 mm. Moist furfural residue was fed into the cylinder furnace at 151 kg/h, and butane was fed from the burner to the leading end as an auxiliary fuel at 14.8 kg/h, the air rate being 174 m$^3$/NTP/h. Air was fed into the coking zone at three points of the cylinder mantle, a total of 98 m$^3$/NTP/h. The temperature of the cylinder in the activation zone was 930° C., and the dry gas contained CO 3% and H$_2$ 3%. The rotational velocity of the cylinder was 2 r/m. The gas emerging from the cylinder was burned in the end chamber of the outlet end by feeding air into it at 284 m$^3$ NTP/h and butane from the burner as an auxiliary fuel at 5.1 kg/h.

The product obtained from the cylinder was 3.0 kg/h activated carbon with a BET surface area of 659 m$^2$/g and an ash content of 17.2%; from the waste heat vessel 0.73 kg/h product with a BET surface area of 664 m$^2$/g and an ash content of 20.4%, and from the bag filter 0.31 kg/h product with a BET surface area of 246 m$^2$/g and an ash content of 45.6%.

EXAMPLE 2

Furfural residue containing volatiles 78% and ash 1.7% of the dry matter was fed into a cylinder furnace according to Example 1. The moisture content of the furfural residue was 4.1% and its particle size 96% under 10 mm and 11% under 0.42 mm.

Moist furfural residue was fed into the cylinder furnace at 180 kg/h and butane was fed from the burner into the feeding end as an auxiliary fuel at 20.6 kg/h, the air rate being 253 m³ NTP/h. Air was fed into the coking zone at three points of the cylinder mantle, in total 54 m³ NTP/h. The cylinder temperature in the activation zone was 900° C., and the dry gas contained CO 4% and $H_2$ 4%. The gas emerging from the cylinder was burned in accordance with Example 1 by directing into it air at 362 m³ NTP/h and butane from the burner as an auxiliary fuel at 5.0 kg/h.

The product obtained from the cylinder was 1.9 kg/h activated carbon with a BET surface area of 652 m²/g, an ash content of 6.0% when washed, from the waste heat vessel 3.2 kg/h product with a BET surface area of 601 m²/g and an ash content of 15.5%, from the bag filter 0.3 kg/h product with a BET surface area of 519 m²/g and an ash content of 15.7%.

EXAMPLE 3

Furfural residue containing volatiles 78%, its analysis being C 46% and ash 1.2% of the dry matter, was fed into a cylinder furnace according to the previous examples. The moisture content of the furfural residue was 43.8% and the particle size of the dry matter was 94% under 10 mm and 8% under 0.42 mm. Moist furfural residue was fed into the cylinder furnace at 150 kg/h and butane was fed to the feeding end from the burner as an auxiliary fuel at 15.1 kg/h, the air rate being 178 m³ NTP/h. A total of 87 m³ NTP/h air was fed into the coking zone at three points of the mantle surface. The cylinder temperature in the activation zone was 940° C., and the dry gas contained CO 3% and $H_2$ 3%.

The gas emerging from the cylinder was burned in accordance with the previous examples by feeding into it air at 245 m³ NTP/h and butane from the burner as an auxiliary fuel at 5.1 kg/h.

The product obtained from the cylinder was activated carbon with a BET surface area of 801 m²/g and an ash content of 15.5%, from the waste heat vessel a product with a BET surface area of 664 m²/g and an ash content of 16.9%, and from the bag filter a product with a BET surface area of 257 m²/g and an ash content of 50.7%.

What is claimed is:

1. A process for the production of activated carbon from a moist organic substance, having a moisture content of 30-70% by weight which comprises
   conducting the moist organic substance into a drying zone of a as chamber;
   mixing the organic substance in the drying zone with hot flue gases according to the co-current principle;
   directing the dried organic substances into a coking zone of the same gas chamber;
   introducing an oxygen-bearing gas into the coking zone, for the controlled burning of the volatile constituents of the organic substance at an elevated temperature and according to the co-current principle;
   directing the material and hot moist gases emerging from the coking zone into an activation zone of the same gas chamber;
   activating the coked material in the activation zone by mixing with the hot, moist gases according to the co-current principle and without separate addition of water vapor; and
   separating the activated carbon from gases.

2. A process according to claim 1, wherein the organic substance is a residue from the production of furfural.

3. A process according to claim 1, wherein part of said gases separated is directed to the drying zone.

* * * * *

UNITED STATES PATENT AND TRADEMARK OFFICE
CERTIFICATE OF CORRECTION

PATENT NO. : 4,313,849
DATED : February 2, 1982
INVENTOR(S) : Frans H. Tuovinen et al It is certified that error appears in the above—identified patent and that said Letters Patent is hereby corrected as shown below:

Column 4, line 31:

"poroportion" should read --proportion--.

Column 6, line 15:

"a as chamber" should read --a gas chamber--.

Column 6, line 19:

"substances" should read --substance--.

Signed and Sealed this

Thirteenth Day of July 1982

[SEAL]

Attest:

GERALD J. MOSSINGHOFF

Attesting Officer    Commissioner of Patents and Trademarks